US010708129B1

(12) United States Patent
Levin et al.

(10) Patent No.: US 10,708,129 B1
(45) Date of Patent: Jul. 7, 2020

(54) CHANGING HARDWARE CAPABILITIES OF A DEVICE

(71) Applicant: Amazon Technologies, Inc., Seattle, WA (US)

(72) Inventors: Alex Levin, Cupertino, CA (US); Ihab Bishara, Mountain View, CA (US); Georgy Machulsky, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/298,208

(22) Filed: Oct. 19, 2016

(51) Int. Cl.
| | |
|---|---|
| *H04L 29/06* | (2006.01) |
| *H04L 29/08* | (2006.01) |
| *G06F 17/30* | (2006.01) |
| *H04L 12/24* | (2006.01) |
| *H04L 9/32* | (2006.01) |
| *H04L 9/30* | (2006.01) |

(52) U.S. Cl.
CPC ............ *H04L 41/0813* (2013.01); *H04L 9/30* (2013.01); *H04L 9/321* (2013.01); *H04L 63/0428* (2013.01)

(58) Field of Classification Search
CPC .................. H04L 41/0813; H04L 63/0428
USPC ........ 709/220, 223, 224, 227; 370/230, 252, 370/468
See application file for complete search history.

(56) References Cited

U.S. PATENT DOCUMENTS

| | | | |
|---|---|---|---|
| 6,876,668 B1 * | 4/2005 | Chawla ................... | H04L 47/52 370/230 |
| 8,024,808 B1 * | 9/2011 | Gleichauf ............. | H04L 47/762 713/153 |
| 9,538,616 B2 | 1/2017 | Dijik et al. | |
| 9,769,131 B1 | 9/2017 | Hartley et al. | |
| 9,894,471 B1 | 2/2018 | Zalewski et al. | |
| 9,924,392 B2 | 3/2018 | Cote et al. | |
| 2005/0132351 A1 * | 6/2005 | Randall ................ | G06F 11/1433 717/168 |
| 2007/0002897 A1 * | 1/2007 | Goshen ............. | H04L 29/06027 370/468 |
| 2009/0007091 A1 | 1/2009 | Appiah et al. | |
| 2009/0150893 A1 * | 6/2009 | Johnson ................ | G06F 9/5088 718/104 |
| 2010/0020685 A1 * | 1/2010 | Short ...................... | H04L 12/14 370/230 |
| 2010/0202450 A1 | 8/2010 | Ansari et al. | |

(Continued)

OTHER PUBLICATIONS

"IMS Device Configuration and Supporting Services Version 1.0"—GSMA, Feb. 2015 https://www.gsma.com/newsroom/wp-content/uploads/RCC-15-v1-0.pdf (Year: 2015).*

*Primary Examiner* — Randy A Scott
(74) *Attorney, Agent, or Firm* — Thorpe North & Western, LLP.

(57) ABSTRACT

A technology is provided for changing a hardware capability of an internet capable device. A hardware capability of an internet capable device is restrained to a first limit based on a first configuration definition. A second configuration definition is requested to change the first limit set by the first configuration definition from a service provider environment. A second configuration definition is received from the service provider environment at the internet capable device. The hardware capability of the internet capable device are changed to a second limit based on the second configuration definition.

20 Claims, 7 Drawing Sheets

(56) References Cited

U.S. PATENT DOCUMENTS

| | | | |
|---|---|---|---|
| 2012/0047551 A1* | 2/2012 | Pattar | H04W 4/00 |
| | | | 726/1 |
| 2012/0295510 A1 | 11/2012 | Boeckle | |
| 2013/0139154 A1* | 5/2013 | Shah | G06F 9/45558 |
| | | | 718/1 |
| 2014/0183957 A1 | 7/2014 | Duchesneau | |
| 2014/0229928 A1 | 8/2014 | Edstrom et al. | |
| 2015/0347683 A1 | 12/2015 | Ansari et al. | |
| 2016/0036719 A1 | 2/2016 | Alicherry et al. | |
| 2016/0092871 A1 | 3/2016 | Gordon et al. | |
| 2016/0191723 A1 | 6/2016 | Yue | |
| 2017/0075676 A1 | 3/2017 | Li | |
| 2017/0085686 A1 | 3/2017 | Gilchrist et al. | |
| 2017/0180147 A1 | 6/2017 | Brandman et al. | |
| 2017/0366586 A1 | 12/2017 | Bloesch et al. | |
| 2018/0068091 A1 | 3/2018 | Gaidar et al. | |
| 2018/0183765 A1 | 6/2018 | Neumann et al. | |

* cited by examiner

CHANGING HARDWARE CAPABILITIES OF A DEVICE

BACKGROUND

Electronic devices and computing systems have become ever-present in many aspects of society. Devices may be found in the workplace, at home, or at school. Devices may be networked to one another via datalinks for exchanging data and content from device to another. Computing systems may communicate with other networked computing systems across a network via a network device such as a router and using other network components.

A computing system may rely on a network of remote computing systems and devices to store, manage, process, or provide data to the computing system. Computing systems and network devices may have a hardware capability including a hardware capability for different components of the computing system. One device may have a different hardware capability from another device. In addition, computing customers may use more powerful computing devices for more extensive computing tasks or less powerful computers for less intensive computing tasks. For example, a computing customer may use a powerful server for compiling source code but use a less powerful computer for streaming video.

DETAILED DESCRIPTION

Figure 1:
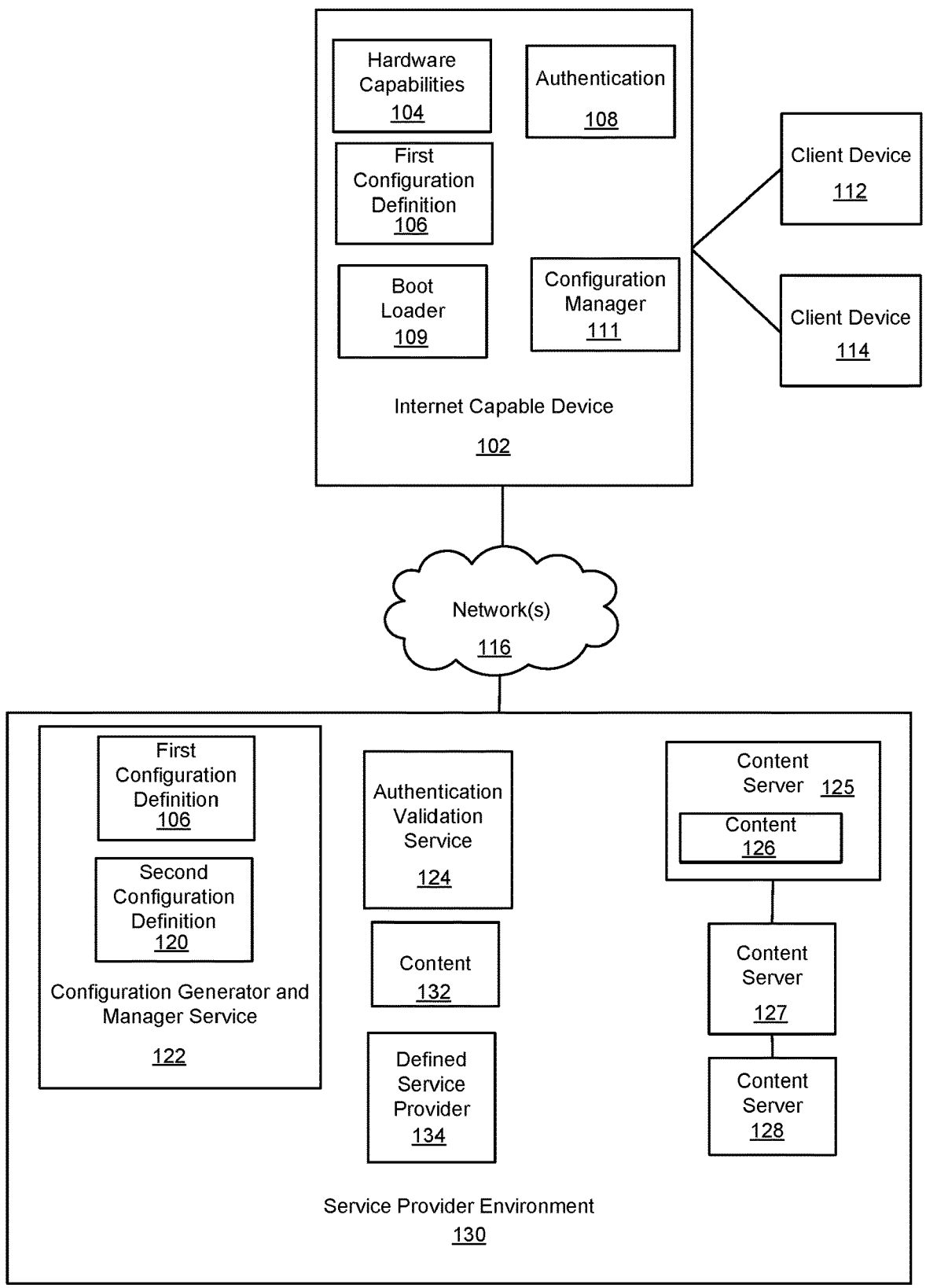
FIG. 1 is a block diagram illustrating a system for changing a hardware capability of an internet capable device according to an example of the present technology.

The present technology may change a hardware capability of an internet capable device using data and commands obtained from or send from a service provider environment. An internet capable device may have various components or resources which each have hardware capabilities. Those hardware capabilities may have a full capacity that may be limited (e.g., throttled, capacity reduced, speed reduced, etc.) using a first configuration definition installed or loaded at the internet capable device. The first configuration definition may be a file that is loaded in the internet capable devices operating system or firmware to define the hardware capabilities. The internet capable device may request and apply a second configuration definition from a service in a service provider environment to change the limits of the hardware capabilities using a second configuration definition. The term internet capable device may include a variety of different devices that are capable of connecting to a network or the internet to exchange data, such as media servers, set top boxes, network gateways, firewalls, network address translation (NAT) devices, Internet of Things (IoT) devices, game consoles, routers, network bridges, modems, wireless access points, line drivers, switches, hubs, and repeaters; and may also include hybrid network devices such as multilayer switches, protocol converters, bridge routers, proxy servers, network address translators, multiplexers, network interface controllers, wireless network interface controllers, ISDN terminal adapters and other related hardware. Internet capable devices may be physical devices used for communication and interaction between devices on a computer network or may be physical devices used to mediate data in a computer network. The internet capable device may connect with a client device to provide data to a client device from a service provider environment or the internet capable device may be an end client device.

In one example, the second configuration definition may be employed while the internet capable device is receiving data or content (e.g., media content, video, audio, etc.) from a defined service provider or a particular content provider. For example, the media content may come from a provider who has authorization on the internet capable device to use more powerful hardware to provide, decode, or display the media content. After the content has been provided to the internet capable device from the defined service provider (e.g., a presentation has completed), the internet capable device may revert back to the first configuration definition to again limit the hardware capabilities of the internet capable device. This example may be employed in a scenario where the defined service provider supplies content such as video streaming to the internet capable device using the second configuration definition and content from other service providers is provided using the first configuration definition such that the second configuration definition has higher limits on the hardware capabilities compared to the first configuration definition. For example, the second configuration definition may provide for higher network bandwidth or faster processing compared to the first configuration definition. Thus, a user experiencing the content may experience the content from the defined service provider faster or at a higher quality level compared to content from the other service providers. In this example, the defined service provider may provide the internet capable device to the user so that the user may have a better user experience using the internet capable device with the second configuration definition for content from the defined service provider compared to content from the other service providers using the first configuration definition. The user may also purchase the content from the defined service provider as part of a service where the content is to be delivered using the second configuration definition as part of the purchased service.

In an alternative example, the second configuration definition may be used by the internet capable device for a predetermined amount of time after which the internet capable device reverts to the first configuration definition. The user may have authorization for, request, or pay for the second configuration definition for a predetermined amount of time, such as for one hour or for one day. For example, this allows the user to purchase the internet capable device with a first configuration definition at a lower price compared to the internet capable device sold with full hardware capabilities. The user may then purchase or receive authorization for the second configuration definition with higher limits on the hardware capabilities compared to the first configuration definition, when the user desires to have the increased hardware capabilities.

In one aspect, the user may be able to request the second configuration definition with limits set by the user. For example, the internet capable device may have many different resources with hardware capabilities such as network bandwidth, single or dual band Wi-Fi capabilities, a different number of processing cores for the central processing unit (CPU), the frequency of a CPU or a core of a CPU, different amounts of random access memory (RAM), different amount of network bandwidth, etc. Thus, the user may be able to request a second configuration definition where the user sets the limits or parameters of the second configuration definition such as the number of processing cores to be used, whether a single or dual band Wi-Fi is used, etc. In one aspect, the request for a second configuration definition may be generated by a user via a client device and the request is sent to the internet capable device. The internet capable device then sends the request to a modification or manager service in a service provider environment.

The second configuration definition may be encrypted or otherwise securely protected by the service provider environment before sending the second configuration definition to the internet capable device. The internet capable device is then able to decrypt or decode the encrypted second configuration definition. The internet capable device may be configured to only accept configuration definitions that are encrypted or protected. This process may be secured or hidden from a user and may ensure that only authorized configuration definitions are implemented at the internet capable device. In one aspect, the request for the second configuration definition is sent from the internet capable device with an authentication. The authentication may identify a user or user credentials to ensure that only authorized internet capable devices are able to request and receive configuration definitions from the service provider environment. The authentication may also contain data with proof that a user has purchased a configuration definition and is authorized to receive the configuration definition at the internet capable device. The service provider environment may have authentication validation processes to authenticate the authentication. The authentication and encryption described herein may employ cryptography techniques such as public and private key encryption, symmetrical key encryption, or other methods of protection.

FIG. 1 illustrates a computing environment 100 for changing hardware capabilities of an internet capable device according to an example of the present technology. The computing environment 100 may include an internet capable device 102, client devices 112 and 114, a network 116, and a service provider environment 130.

The internet capable device 102 may be any type of computing device that is capable of connecting to the network 116 for exchanging data. The internet capable device 102 may be a set top box, a personal computer, a laptop, a notebook, a smartphone, a router, a wireless router, a media server, a gateway, a network address translation (NAT) box, a firewall, Internet of Things (IoT) devices, game console, a network access point, etc. The internet capable device 102 may be a device in a personals setting or an enterprise setting. The internet capable device 102 may have resources (e.g., hardware resources) and components with resources. The computer hardware may make up the hardware capabilities 104 that form the capacity of these resources. For example, the internet capable device 102 may be a dual band router that has the capacity to send wireless data over dual channels such as 2.4 GHz and 5 GHz. The full capacity of this resource would be to send wireless data over both of these channels simultaneously at a maximum data throughput speed. In one aspect, a configuration definition may set a wireless throughput capacity limit by turning on or off one of the bands of the dual band router. The resources may also include the memory, storage capacity, network bandwidth, number of cores of the CPU, the frequency of the CPU, etc. The resources in the internet capable device 102 may be connected to or accessed by the internet capable device 102 over a peripheral component interconnect (PCI) or PCI express (PCIe) connection(s). The client devices 112 and 114 may access the internet capable device 102 to exchange data or otherwise use the resources of the internet capable device 102.

In one aspect, the capacity of the hardware capabilities 104 of the internet capable device 102 is limited by a first configuration definition 106. The first configuration definition 106 may be a configuration file that is installed or written to memory of the operating system of the internet capable device 102. The constraints of the first configuration definition 106 may be used to turn on or off resources. For example, the constraints of the first configuration definition 106 may turn off some of the processing cores or may limit a resource such as network bandwidth to a predetermined speed. In one aspect, the constraints or limits for the first configuration definition 106 are enforced at the internet capable device 102 by limiting the express lanes used for PCI or PCIe. For example, a configuration definition may limit the speed of a PCI connection, the width (e.g., lane width or link width) of a PCI connection, or both. The restraints or limits set by the first configuration definition 106 may be described as throttling the hardware capabilities of the internet capable device 102. In another example, the internet capable device 102 may be a dual band router and the first configuration definition 106 may limit the internet capable device 102 to only use one of the channels of the dual band router. The first configuration definition 106 may be designed to limit every hardware capability or resource of the internet capable device 102 or may only limit one or some of the resources. The first configuration definition 106 (e.g., configuration file or configuration settings) may be designed or generated by a user or may be generated and installed by the manufacturer or seller of the internet capable device 102. The first configuration definition 106 may be managed at the internet capable device 102 by the configuration definition manager 111. The configuration definition manager 111 may be employed to determine which configuration definition to use and may also be used to request a different configuration definition.

In one aspect, a boot loader 109 may be employed by the internet capable device 102 at the time the internet capable device 102 is booted up to load a specific hardware configuration definition (e.g., the first configuration definition 106). The boot loader 109 may be employed to determine which configuration definition to load or execute if more than one configuration definition is present.

In one aspect, the first configuration definition 106 sets limits to restrain the hardware capabilities for the internet capable device 102 to access content 132 provided by the service provider environment 130. The content 132 may be provided by the content servers 125, 127, and 128 or the defined service provider 134. Each of the content servers 125, 127, and 128 may provide unique content. For example, content server 125 is depicted as hosting content 126 that may be provided to or accessed by the internet capable device 102. The service provider environment 130 may be described as a plurality of hardware computing systems and/or services employed to provide virtualized computing services accessible to other devices or software via a network 116 (e.g., the internet). The content servers 125, 127, and 128 and the defined service provider 134 may be hardware computer systems or virtual computer systems. For example, the virtual computer systems may be computing instances or virtual machines that acts as content servers.

The client devices 112 and 114 may be end user devices such as set top boxes, voice activated service devices, desktop computers, smart phones, laptops, personal computers, etc. The client devices 112 and 114 may be employed for consuming content or data from the service provider environment 130. In addition, the client devices 112, 114 may execute an application that is in communication with services and computing instances on service provider environment 130 and the services and resources in the service provider environment 130 may provide information to the application. The client devices 112 and 114 may access or request a configuration definition file for the Internet capable device 102 via a user interface of the internet capable device 102 that is executed at the client devices 112 and 114. The internet capable device 102 may receive a request from the client device 112 to change the limits set for the hardware capabilities 104 which were set by the first configuration definition 106. This request may be forwarded by the configuration manager 111 to the service provider environment 130. The request may be sent over network 116.

The service provider environment 130 may receive the request at a traffic request director, not depicted, and the request may be routed to the appropriate location or resource within the service provider environment 130 that may receive the request to change the constraints or limits set for the hardware capabilities of the internet capable device 102. The request may be sent directly to a configuration generator and manager service 122 where the request is employed to generate the second configuration definition 120 tailored to the parameters specified in the request. For example, the user may request parameters or limits that are to be changed in the second configuration definition 120 such as the limit for a particular resource or a time limit for how long the second configuration definition 120 is to be used at the internet capable device 102. If the user or application has the appropriate authentication rights, then the changes may be available from the configuration generator and manager service 122. In one configuration definition, the parameters requested by the user may be employed to determine a purchase price for the second configuration definition 120.

In one aspect, the request is sent with an authentication 108 and is first sent to the authentication validation service 124. The authentication may an authentication signature. The authentication 108 and the authentication validation service 124 may employ encryption and/or authentication techniques that ensure that the request came from the internet capable device 102. The second configuration definition 120 may not be sent to the internet capable device 102 until after the request has been authenticated. The authentication 108 may comprise user credentials and may also comprise proof of payment for the second configuration definition 120. The encryption may employ cryptography such as public and private key encryption. In one aspect, the authentication 108 uses a public key and is authenticated at the authentication validation 124 in the service provider environment 130 using a private key.

The configuration generator and manager service 122 may be capable of generating any number of configuration definitions for any number of different types of internet capable device 102. The configuration definitions may be set to expire after a predetermined amount of time. The configuration definitions may be generated based on a user request or may be pre-generated with default limits set for the hardware capabilities 104. Based on the request, the second configuration definition 120 is then sent to the internet capable device 102 from the service provider environment 130.

In one aspect, the second configuration definition 120 is sent back to the internet capable device 102 and is used by the internet capable device 102 to set the constraints or limits on the hardware capabilities 104 to a second limit different than the first limit set by first configuration definition 106. The first limit may be higher or lower than the second limit. The internet capable device 102 may request any number of different configuration definitions during operation and may request the same configuration definition more than once. For example, the second configuration definition 120 may be designed to be used by the internet capable device 102 for a predetermined period of time after the second configuration definition 120 has been set, then the internet capable device 102 may revert back to the first configuration definition 106 and delete the second configuration definition 120. Subsequently, the internet capable device 102 may again request the second configuration definition 120 for a different period of time. The second configuration definition 120 may be authorized or purchased for a predetermined amount of time such as one hour and the user may use the second configuration definition 120 for 30 minutes, then revert back to the first configuration definition 106 and subsequently change back to the first configuration definition 106 to use the remaining thirty minutes. This may leave 30 minutes of remaining use for a different point in time.

The second configuration definition 120 may be installed, burned or otherwise applied at the internet capable device 102 after the second configuration definition 120 has been received from the service provider environment 130. The second configuration definition 120 may be managed and applied at the internet capable device 102 by the configuration manager 111. The internet capable device 102 may need to be rebooted to use the second configuration definition 120. Upon reboot, the boot loader 109 may select the second configuration definition 120 to be used. The second configuration definition may be authenticated by the boot loader 109 and may be applied to the internet capable device 102. During the use of the second configuration definition 120, a user may request that the internet capable device 102 revert back to the first configuration definition 106 or to a third configuration definition.

In one aspect, the second configuration definition 120 is encrypted by the service provider environment 130 before it is sent to the internet capable device 102. The internet capable device 102 is then able to decrypt the second configuration definition 120 before using the second configuration definition 120. The internet capable device 102 may be set up to ensure that only configuration definitions generated by the configuration generator and manager service 122 are used. Checking that the configuration definitions are authentic may include the use of encryption, watermarks, lock and key schemes, tokens, etc.

In one aspect, the second configuration definition 120 is employed only for specific content such as the content 132 provided by defined service provider 134. The content from defined service provider 134 may be premium content or content that the user has paid a service to consume. The content may be video streaming content (or audio content, streaming game data, streaming business data, etc.) and the defined service provider 134 may desire to provide content at a higher rate than would be allowed by the constraints or limits set by the first configuration definition 106. Therefore, the content from the defined service provider 134 may be consumed by the internet capable device 102 and the client device 112 using the second configuration definition 120 at the internet capable device 102 and the second configuration definition 120 may have higher limits compared to the first configuration definition 106. Thus, the users may experience the content at rates that are faster or allow for higher resolution when using the second configuration definition 120. In this example, content from other service providers would still be provided using the first configuration definition 106. In one aspect, the content from the defined service provider 134 is tagged to invoke the second configuration definition 120 at the internet capable device 102. This may be accomplished by tagging the content and basing the consumption of the content at the internet capable device 102 on the tags for the content with the second configuration definition 120. The content may also need to be decrypted (i.e., using DRM (digital rights management) schemes) and so user credentials may be used to allow the decryption of the content. The first configuration definition 106 or the second configuration definition 120 may make changes to the internet capable device 102 at an application layer in the internet capable device 102 or at an operating system kernel level.

Figure 2:
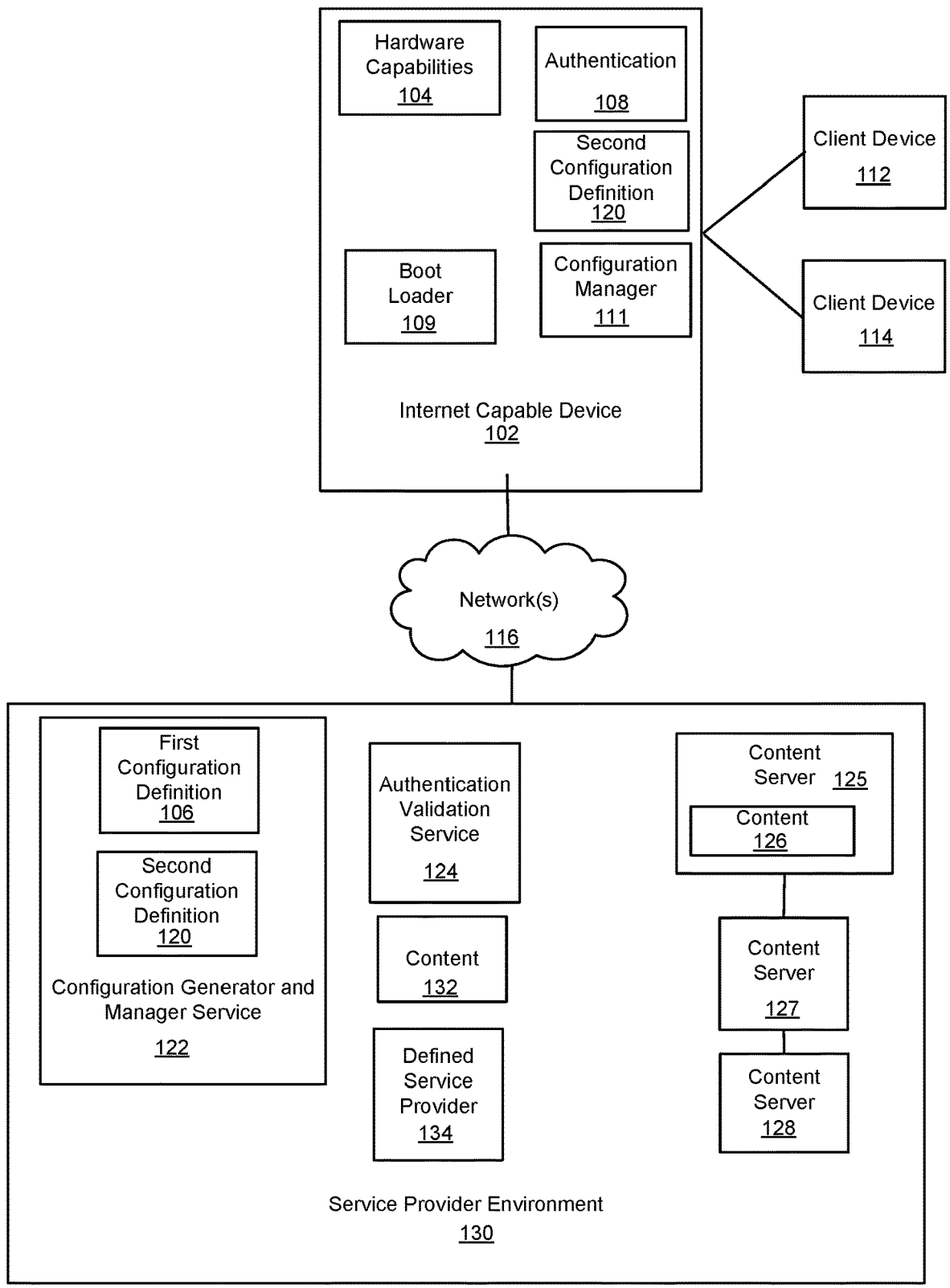
FIG. 2 is a block diagram illustrating a system for use with an internet capable device with a second configuration according to an example of the present technology.

FIG. 2 illustrates a computing environment 200 for changing hardware capabilities of an internet capable device with a second configuration definition according to an example of the present technology. The computing environment 200 may include the same features, components, and capabilities of computing environment 100 of FIG. 1.

The internet capable device 102 of computing environment 200 is depicted with the second configuration definition 120. After the second configuration definition 120 has been received by the internet capable device 102, the first configuration definition 106 may or may not be deleted. In the computing environment 200, the network 116 may receive the second configuration definition 120 from the service provider environment 130 and may use the second configuration definition 120 to limit the hardware capabilities of the internet capable device 102 at a limit different than the limits of the first configuration definition 106. The limits of the second configuration definition 120 may be that there are no limits for the internet capable device 102 or may be higher or lower compared to the limits of the first configuration definition 106.

Figure 3:
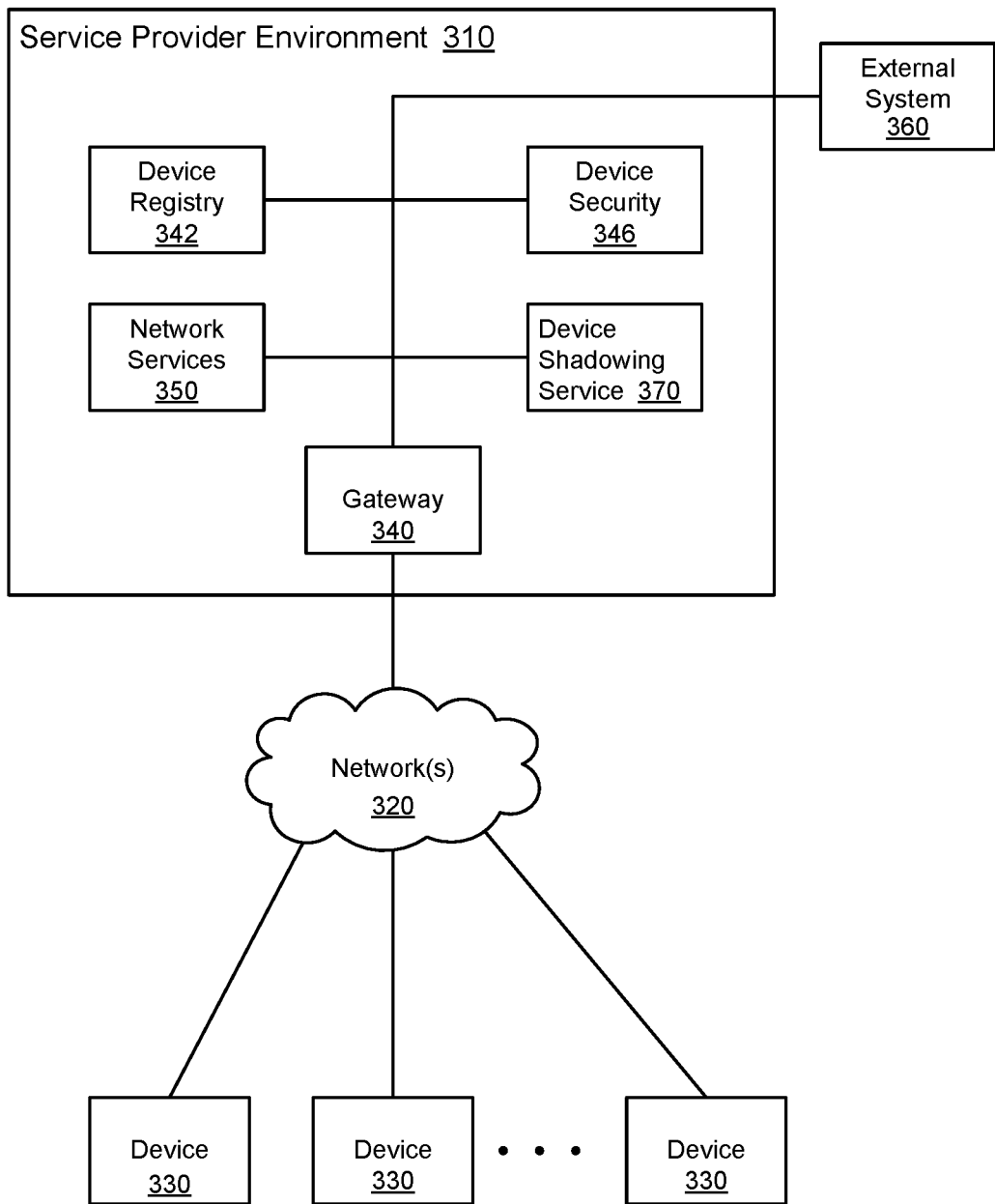
FIG. 3 illustrates a block diagram of an example computer networking architecture for providing device access to network services in a service provider environment.

FIG. 3 is a block diagram illustrating an example service provider environment 310 with which the devices 330 (e.g., an internet capable device 102 as in claim) described earlier may communicate. Particularly, the environment of FIG. 3 may be useful for IoT devices as described earlier. The IoT device may be able to use the services illustrated in FIG. 3 and once connected use the configuration definition service of the technology described in FIG. 1 and FIG. 2. The service provider environment 310, which may be referred to as a device communication environment or system that comprises various resources made accessible via a gateway server 340 to the devices 330 that access the gateway server 340 via a network 320. The devices 330 may access the service provider environment 310 in order to access services such as a device shadowing service 370, data storage, and computing processing features. Services operating in the service provider environment 310 may communicate data and messages to the devices 330 in response to requests from the devices 330 and/or in response to computing operations within the services.

The service provider environment 310 may comprise communicatively coupled component systems 340, 342, 346, 350 and 370 that operate to provide services to the devices 330. The gateway server 340 may be configured to provide an interface between the devices 330 and the service provider environment 310. The gateway server 340 receives requests from the devices 330 and forwards corresponding data and messages to the appropriate systems within the service provider environment 310. Likewise, when systems within the service provider environment 310 attempt to communicate data instructions to the devices 330, the gateway server 340 routes those requests to the correct device 330.

The gateway server 340 may be adapted to communicate with varied devices 330 using various different computing and communication capabilities. For example, the gateway server 340 may be adapted to communicate using either TCP (Transmission Control Protocol) or UDP (User Datagram Protocol) protocols. Likewise, the gateway server 340 may be programmed to receive and communicate with the devices 330 using any suitable protocol including, for example, MQTT, CoAP, HTTP, and HTTPS. The gateway server 340 may be programmed to convert the data and instructions or messages received from the devices 330 into a format that may be used by other server systems comprised in the service provider environment 310. In one example, the gateway server 340 may be adapted to convert a message received using the HTTPS protocol into a JSON formatted message that is suitable for communication to other servers within the service provider environment 310.

The gateway server 340 may store, or may control the storing, of information regarding the devices 330 that have formed a connection to the particular gateway server 340 and for which the particular gateway server 340 may be generally relied upon for communications with the device 330. In one example, the gateway server 340 may have stored thereon information specifying the particular device 330 such as a device identifier. For each connection established from the particular device 330, the gateway server 340 may also maintain information identifying the connection. For example, a connection identifier may be generated and stored for each connection established with a particular device 330. Information relating to the particular connection may also be stored. For example, information identifying the particular socket of the gateway server 340 on which the connection was established, as well as information identifying the particular protocol used by the device 330 on the connection may be stored by the gateway server 340. Information such as the socket and protocol may be used in order to facilitate further communications via the particular connection.

In one example, the gateway server 340 may communicate via any suitable networking technology with a device registry server 342. The device registry server 342 may be adapted to track the attributes and capabilities of each device 330. In an example, the device registry sever 342 may be provisioned with information specifying the attributes of the devices 330. The device registry server 342 may comprise data specifying rules or logic (e.g., automation rules) for handling various requests that may be received from the devices 330. The device registry server 342 may be programmed to convert specialized device functions or commands received in particular communication protocols such as, for example HTTPS, MQTT, CoAP, into functions or commands using particular protocols that are understood by other of the servers in the service provider environment 310. In one example, the device registry server 342 may be provisioned with information specifying that upon receipt of a particular request from a particular device 330, a request should be made to store the payload data of the request in a particular network service server 350. The device registry server 342 may be similarly programmed to receive requests from servers 342, 350 and convert those requests into commands and protocols understood by the devices 330.

The device shadowing service server 370 maintains state information for each connected device 330. In an example embodiment, the device shadowing service server 370 maintains for each device 330 that has connected to the environment 310 information specifying a plurality of states. In an example scenario, the device shadowing service server 370 may comprise a recorded state and a desired state. The recorded state represents the existing state of the particular device 330 as presently known to the device shadowing service server 370. The device shadowing service server 370 may be configured to manage multi-step device state transitions as described earlier. The device shadowing service server 370 communicates with the device gateway 340 in order to communicate requests to update a status to a particular device 330. For example, the device shadowing sever 370 may communicate to the device gateway 340 a sequence of state transition commands that update the status of a device 330. The device gateway 340 may, in response, communicate the appropriate commands formatted for the particular device.

The device security server 346 maintains security-related information for the devices 330 that connect to the service provider environment 310. In one example, the device security server 346 may be programmed to process requests to register devices with the service provider environment 310. For example, entities such as device manufacturers, may forward requests to register devices 330 with the service provider environment 310. The device security server 346 receives registration requests and assigns unique device identifiers to devices 330 which use the device identifiers on subsequent requests to access the service provider environment 310. The device security server 346 stores, for each registered device, authentication information that may be provided during the device registration process. For example, a request to register a device 330 may comprise information identifying the device 330 such as a device serial number and information for use in authenticating the device 330. In one example, the information may comprise a digital certificate and may comprise a public key of a public key-private key pair. The information may be stored in relation to the assigned device identifier for the particular device 330. When the device 330 subsequently attempts to access the service provider environment 310, the request may be routed to the device security server 346 for evaluation. The device security server 346 determines whether authentication information provided in the request is consistent with the authentication information stored in relation to the device identifier and provided during the registration process.

The device security server 346 may be further programmed to process request to associate particular entities (individuals or organizations) with particular devices 330. The device security server 346 may be adapted to receive requests to register entities, which may be, for example, individuals, users, accounts, and/or organizations, as authorized to control or communicate with a particular device 330. In one example, a request may be received from an individual or organization that may have purchased a device 330 from a manufacturer. For example, the device may be a dishwasher, thermostat, or lighting assembly that an individual or organization purchased from the manufacturer. The individual or organization may initiate a request to register the device 330 with the individual or an organization with which the organization is associated. The request may be routed to a web services server which may be comprised in service provider environment 310 or which communicates the request to the service provider environment 310. The request identifies the device 330 and the particular entity (individual or organization) that is requesting to be associated with the device 330. In one example, the request may comprise a unique device identifier that was assigned when the device 330 was registered with the system. The request further may comprise information uniquely identifying the entity that is registering as having authority to communicate with and/or control the particular device 330.

The device security server 346 stores the information identifying the particular entity in relation with the device identifier. When the particular entity subsequently attempts to control or communicate data to the particular device 330, the device security server 346 may use the information to confirm that the particular entity is authorized to communicate with or control the particular device 330. When an entity that has not been registered as being authorized to communicate with the device 330 attempts to communicate with or control the device 330, the device security server 346 may use the information stored in the device security server 346 to deny the request.

A network services server 350 may be any resource or processing server that may be used by any of servers 340, 342, 346, or 370 in processing requests from the devices 330. In one example, network services server 350 may provide data storage and retrieval services and/or on-demand processing capacity. In an example scenario, the network services server 350 may be any of numerous network accessible services including, for example, web or cloud-based services. In one example, the web services server 350 may be programmed to provide particular processing for particular devices 330 and/or groups of devices 330. For example, a network services server 350 may be provisioned with software that coordinates the operation of a particular set of devices 330 that control a particular manufacturing operation.

Servers 340, 342, 346, 350, and 370 may be communicatively coupled via any suitable networking hardware and software. For example, the servers may communicate via a local area network or wide area network.

An external system 360 may access service provider environment 310 for any number of purposes. In one example, an external system 360 may be a system adapted to forward requests to register devices 330 with the service provider environment 310. For example, an external system 360 may include a server operated by or for a device manufacturer that sends requests to service provider environment 310, and device security server 346 in particular, to register devices 330 for operation with service provider environment 310. Similarly, the external system 360 may be a system operated to provide a gateway for entities (individuals or organizations) to register an ownership or control relationship with a particular device 330.

The devices 330 may be any devices that may be communicatively coupled via a network 320 with the service provider environment 310. For example, the devices 330 may be computing devices such as smart phones and tablet computers, automobiles, appliances such as washers and driers, industrial sensors, switches, control systems, etc. In one example, each of devices 330 may communicate over the network 320 to store data reflecting the operations of the particular device 330 and/or to request processing provided by, for example, network services server 350. While FIG. 3 depicts three devices 330, it will be appreciated that any number of devices 330 may access the service provider environment 310 via the gateway server 340. Further it will be appreciated that the devices 330 may employ various different communication protocols. For example, some devices 330 may transport data using TCP, while others may communicate data using UDP. Some devices 330 may use MQTT, while others may use CoAP, and still others may use HTTPs. It will also be appreciated that each of devices 330 may be programmed to send and receive particular functions or commands in its requests that are not compatible with other devices or even the systems within service provider environment 310. The gateway server 340 may be programmed to receive and, if needed, attend to converting such requests for processing with the service provider environment 310.

Figure 4:
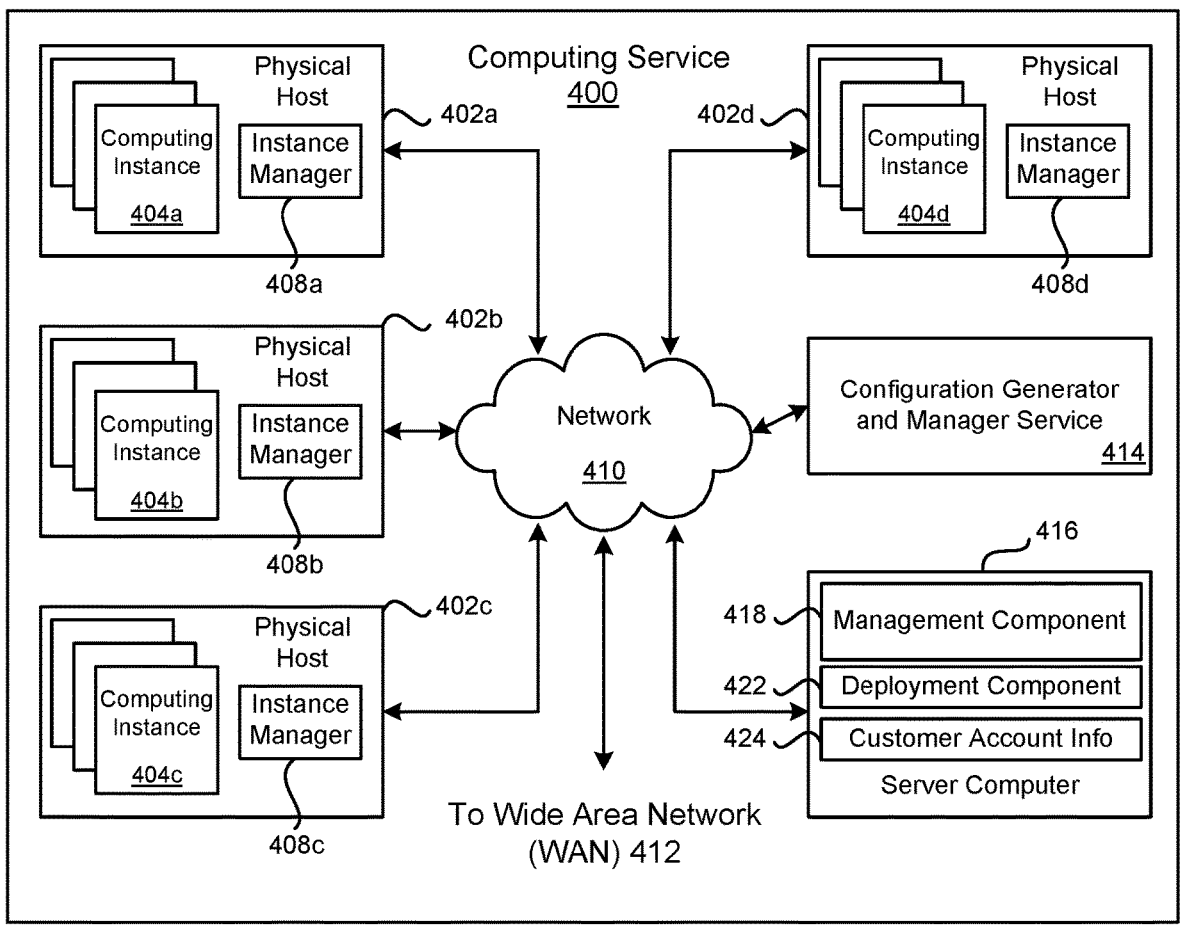
FIG. 4 is a block diagram that illustrates an example computing service environment according to an example of the present technology.

FIG. 4 is a block diagram illustrating an example computing service 400 that may be used to execute software services in a computing service environment or service provider environment. In particular, the computing service 400 depicted illustrates one environment in which the technology described herein may be used. The computing service 400 may be one type of environment that includes various virtualized service resources that may be used, for instance, to host computing instances 404a-d on which a computing service may execute.

The computing service 400 may be capable of delivery of computing, storage and networking capacity as a software service to a community of end recipients. In one example, the computing service 400 may be established for an organization by or on behalf of the organization. That is, the computing service 400 may offer a "private cloud environment." In another example, the computing service 400 may support a multi-tenant environment, wherein a plurality of customers may operate independently (i.e., a public cloud environment). Generally speaking, the computing service 400 may provide the following models: Infrastructure as a Service ("IaaS"), Platform as a Service ("PaaS"), and/or Software as a Service ("SaaS"). Other models may be provided. For the IaaS model, the computing service 400 may offer computers as physical or virtual machines and other resources. The virtual machines may be run as guests by a hypervisor, as described further below. The PaaS model delivers a computing platform that may include an operating system, programming language execution environment, database, and web server.

Application developers may develop and run their software solutions on the computing service platform without incurring the cost of buying and managing the underlying hardware and software. The SaaS model allows installation and operation of application software in the computing service 400. End customers may access the computing service 400 using networked client devices, such as desktop computers, laptops, tablets, smartphones, etc. running web browsers or other lightweight client applications, for example. Illustratively, the computing service 400 may be described as a "cloud" environment.

The particularly illustrated computing service 400 may include a plurality of server computers 402a-d. While four server computers are shown, any number may be used, and large data centers may include thousands of server computers. The computing service 400 may provide computing resources for executing computing instances 404a-d. Computing instances 404a-d may, for example, be virtual machines. A virtual machine may be an instance of a software implementation of a machine (i.e., a computer) that executes applications like a physical machine. In the example of a virtual machine, each of the server computers 402a-d may be configured to execute an instance manager 408a-d capable of executing the instances. The instance manager 408a-d may be a hypervisor, virtual machine monitor (VMM), or another type of program configured to enable the execution of multiple computing instances 404a-d on a single server. Additionally, each of the computing instances 404a-d may be configured to execute one or more applications.

Some of the servers may be used for generating and managing configuration definitions for an internet capable device. For example, a configuration generator and manager service 414 may provide a service to generate and manage the configuration definitions in a service provider environment according to an example of the present technology.

One or more server computers 416 may be reserved to execute software components for managing the operation of the computing service 400 and the computing instances 404a-d. A server computer 416 may execute a management component 418. A customer may access the management component 418 to configure various aspects of the operation of the computing instances 404a-d purchased by a customer. For example, the customer may setup computing instances 404a-d and make changes to the configuration definition of the computing instances 404a-d.

A deployment component 422 may be used to assist customers in the deployment of computing instances 404a-d. The deployment component 422 may have access to account information associated with the computing instances 404a-d, such as the name of an owner of the account, credit card information, country of the owner, etc. The deployment component 422 may receive a configuration definition from a customer that includes data describing how computing instances 404a-d may be configured. For example, the configuration definition may include an operating system, provide one or more applications to be installed in computing instances 404a-d, provide scripts and/or other types of code to be executed for configuring computing instances 404a-d, provide cache logic specifying how an application cache may be prepared, and other types of information. The deployment component 422 may utilize the customer-provided configuration definition and cache logic to configure, initialize, and launch computing instances 404a-d. The configuration definition, cache logic, and other information may be specified by a customer accessing the management component 418 or by providing this information directly to the deployment component 422.

Customer account information 424 may include any desired information associated with a customer of the multi-tenant environment. For example, the customer account information may include a unique identifier for a customer, a customer address, billing information, licensing information, customization parameters for launching instances, scheduling information, etc. As described above, the customer account information 424 may also include security information used in encryption of asynchronous responses to API requests. By "asynchronous" it is meant that the API response may be made at any time after the initial request and with a different network connection.

A network 410 may be utilized to interconnect the computing service 400 and the server computers 402a-d, 416. The network 410 may be a local area network (LAN) and may be connected to a Wide Area Network (WAN) 412 or the Internet, so that end customers may access the computing service 400. The network topology illustrated in FIG. 4 has been simplified; many more networks and networking devices may be utilized to interconnect the various computing systems disclosed herein.

Figure 5:
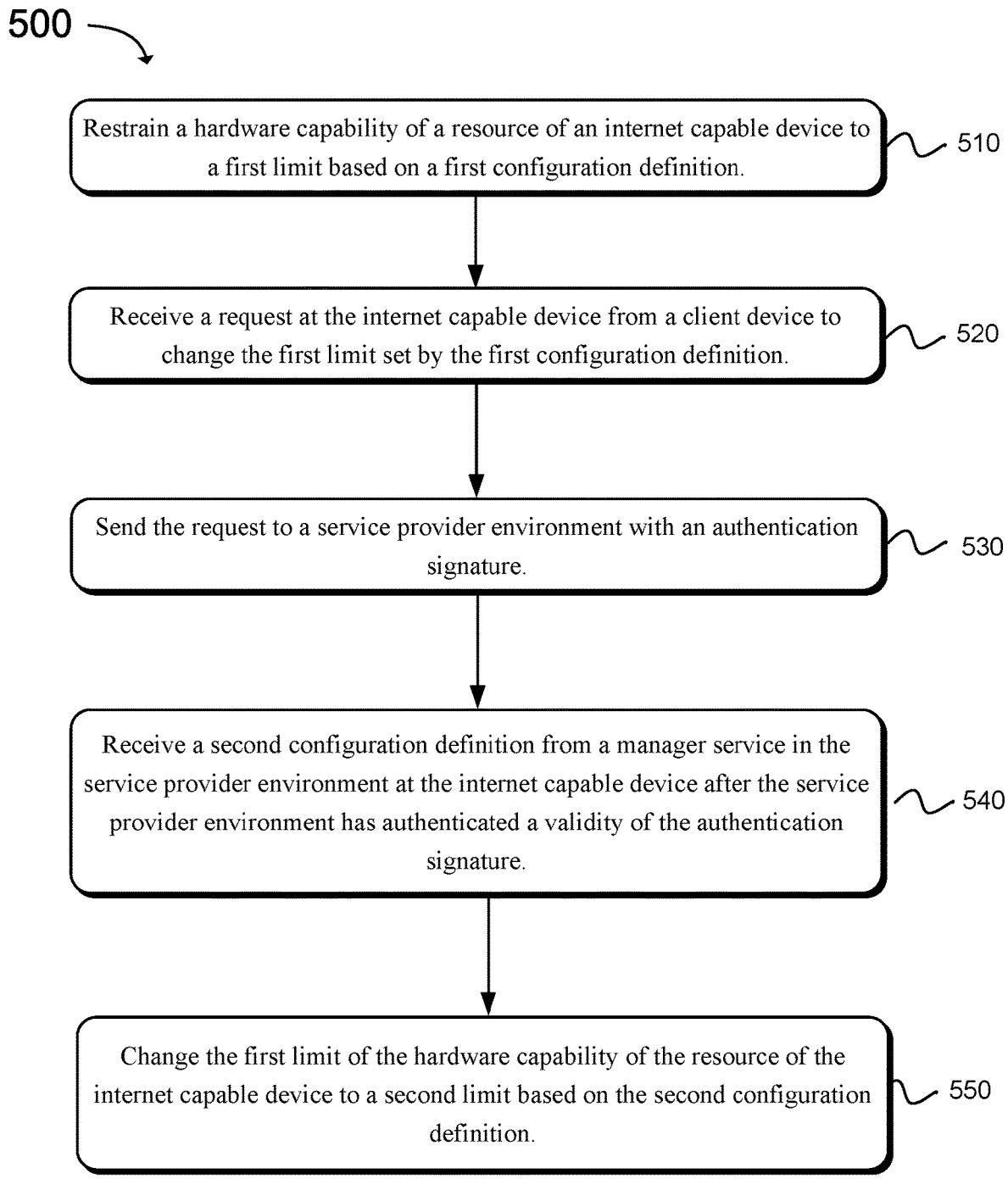
FIGS. 5 and 6 are flowcharts of example methods for changing a hardware capability of an internet capable device according to an example of the present technology.

FIG. 5 is a flowchart of an example method 500 for changing a hardware capability of an internet capable device according to an example of the present technology. The functionality 500 may be implemented as a method and executed as instructions on a machine, where the instructions are included on at least one computer readable medium or one non-transitory machine-readable storage medium. For example, starting in block 510, a hardware capability of a resource of an internet capable device may be restrained to a first limit based on a first configuration definition. A request may be received at the internet capable device from a client device to change the first limit set by the first configuration definition, as in block 520. The request may be sent to a service provider environment with an authentication, as in block 530. A second configuration definition may be received from a manager service in the service provider environment at the internet capable device after the service provider environment has authenticated a validity of the authentication, as in block 540. The first limit of the hardware capability of the resource of the internet capable device may be changed to a second limit based on the second configuration definition, as in block 550.

In one aspect, the authentication uses cryptography and is authenticated at the service provider environment using the cryptography. In one aspect, the hardware capability is network bandwidth for streaming electronic data and the second limit is to increase the network bandwidth compared to the first limit for electronic content received from a particular service provider. In one aspect, the second limit is set for a predetermined amount of time after which the internet capable device reverts to the first limit. In one aspect, the first limit and the second limit operate to limit a speed and/or bandwidth of data communicated over a peripheral component interface (PCI) of the internet capable device.

Figure 6:
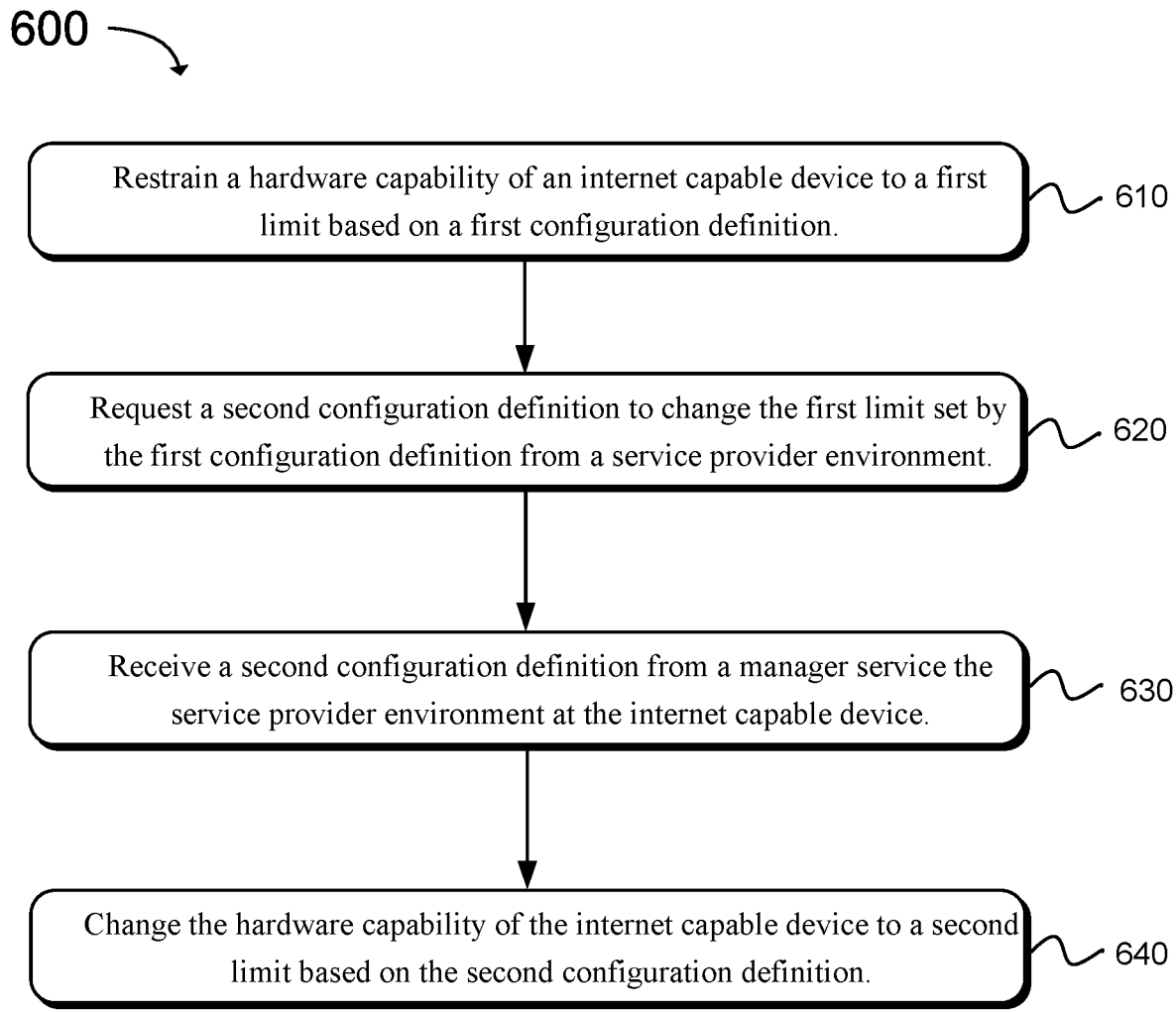

FIG. 6 is a flowchart of an example method 600 for changing a hardware capability of an internet capable device according to an example of the present technology. The functionality 600 may be implemented as a method and executed as instructions on a machine, where the instructions are included on at least one computer readable medium or one non-transitory machine-readable storage medium. For example, starting in block 610, a hardware capability of a resource of an internet capable device may be restrained to a first limit based on a first configuration definition. A request may be received at the internet capable device from a client device to change the first limit set by the first configuration definition originally received from a service provider environment, as in block 620. A second configuration definition may be received by the internet capable device from a manager service in the service provider environment, as in block 630. The hardware capability of the internet capable device may be changed to a second limit based on the second configuration definition, as in block 640.

In one aspect, the second configuration definition is encrypted by the service provider environment and is decrypted by the internet capable device. The second configuration may be loaded by a boot loader of the internet capable device. In another aspect, the request is sent with an authentication and the second configuration definition may not be sent to the internet capable device until a validity of the authentication is determined at the service provider environment. In yet another aspect, the authentication is created using cryptography and is authenticated at the service provider environment using the cryptography.

In one example aspect, the first limit is to limit a full computing capacity of the internet capable device. In other words, the first limit may have no restraints on the limits of the hardware capabilities of the internet capable device. In one aspect, the second limit is set for a predetermined amount of time after which the internet capable device reverts to the first limit. For example, the predetermined amount of time may be measured in hours or days. In one aspect, the first limit and the second limit operate to limit a speed and/or bandwidth of data communicated over a peripheral component interface (PCI) of the internet capable device. By limiting the speed and/or bandwidth of communications over a PCI, the internet capable device may limit any number of hardware capabilities of resources for the internet capable device. In one aspect, the first limit and the second limit are set by turning on or off cores of a processor associated with the internet capable device. In one aspect, the internet capable device is a router and the hardware capability is network bandwidth.

In one aspect, the first configuration definition and the second configuration definition make changes to an application layer of the internet capable device. In one aspect, the first configuration definition and the second configuration definition make changes to an operating system kernel of the internet capable device.

Figure 7:
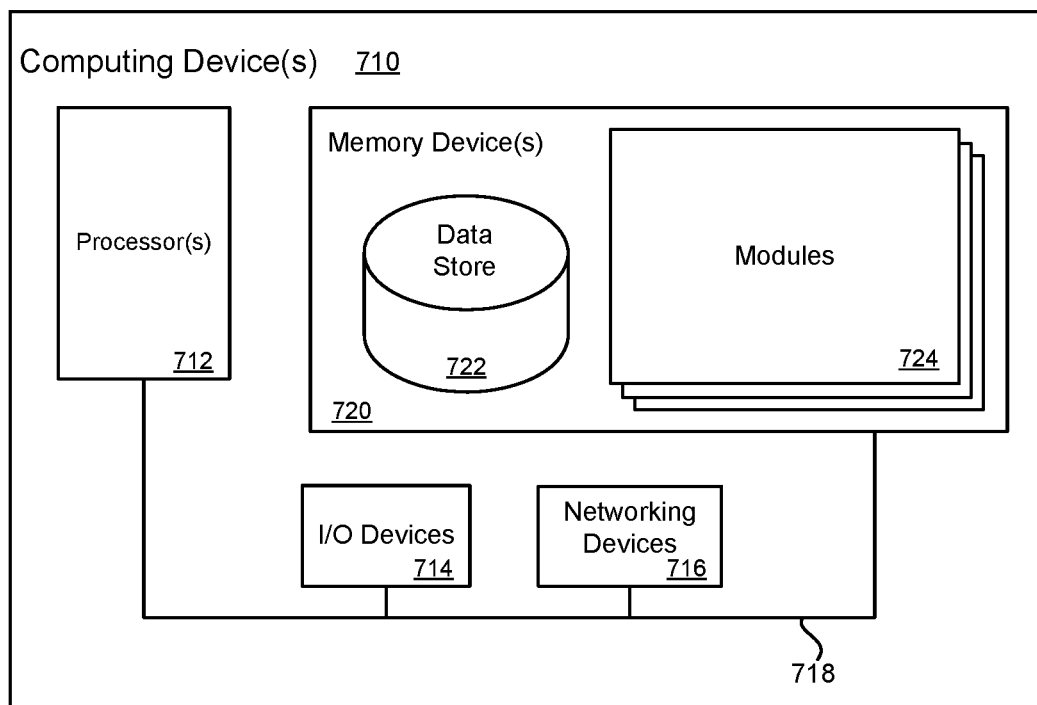
FIG. 7 is a block diagram that provides an example illustration of a computing device that may be employed in the present technology.

FIG. 7 illustrates a computing device 710 on which modules of this technology may execute. A computing device 710 is illustrated on which a high level example of the technology may be executed. The computing device 710 may include one or more processors 712 that are in communication with memory devices 720. The computing device may include a local communication interface 718 for the components in the computing device. For example, the local communication interface may be a local data bus and/or any related address or control busses as may be desired.

The memory device 720 may contain modules 724 that are executable by the processor(s) 712 and data for the modules 724. The modules 724 may execute the functions described earlier. A data store 722 may also be located in the memory device 720 for storing data related to the modules 724 and other applications along with an operating system that is executable by the processor(s) 712.

Other applications may also be stored in the memory device 720 and may be executable by the processor(s) 712. Components or modules discussed in this description that may be implemented in the form of software using high programming level languages that are compiled, interpreted or executed using a hybrid of the methods.

The computing device may also have access to I/O (input/output) devices 714 that are usable by the computing devices. An example of an I/O device is a display screen that is available to display output from the computing devices. Other known I/O device may be used with the computing device as desired. Networking devices 716 and similar communication devices may be included in the computing device. The networking devices 716 may be wired or wireless networking devices that connect to the Internet, a LAN, WAN, or other computing network.

The components or modules that are shown as being stored in the memory device 720 may be executed by the processor 712. The term "executable" may mean a program file that is in a form that may be executed by a processor 712. For example, a program in a higher level language may be compiled into machine code in a format that may be loaded into a random access portion of the memory device 720 and executed by the processor 712, or source code may be loaded by another executable program and interpreted to generate instructions in a random access portion of the memory to be executed by a processor. The executable program may be stored in any portion or component of the memory device 720. For example, the memory device 720 may be random access memory (RAM), read only memory (ROM), flash memory, a solid-state drive, memory card, a hard drive, optical disk, floppy disk, magnetic tape, or any other memory components.

The processor 712 may represent multiple processors and the memory 720 may represent multiple memory units that operate in parallel to the processing circuits. This may provide parallel processing channels for the processes and data in the system. The local interface 718 may be used as a network to facilitate communication between any of the multiple processors and multiple memories. The local interface 718 may use additional systems designed for coordinating communication such as load balancing, bulk data transfer, and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configuration definitions, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

Reference was made to the examples illustrated in the drawings, and specific language was used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A non-transitory machine readable storage medium having instructions embodied thereon, the instructions when executed cause a processor to perform a method for changing a hardware capability of an internet capable device, the method comprising:

restraining, at an internet capable device, a hardware capability of a resource of the internet capable device to a first limit based at least in part on a first configuration definition;

receiving a request at the internet capable device from a client device to change the first limit set by the first configuration definition;

sending the request to change the first limit received from the client device to a service provider environment using the Internet with an authentication identifying the internet capable device and indicating that the client device is authorized for a second limit based at least in part on a second configuration definition;

receiving, via the Internet at the internet capable device, the second configuration definition from a manager service in the service provider environment after the service provider environment has authenticated a validity of the authentication; and changing the first limit of the hardware capability of the resource of the internet capable device to the second limit based at least in part on the second configuration definition loaded using a boot loader of the internet capable device, wherein the second limit is set for an amount of time after which the internet capable device reverts to the first limit.

2. The non-transitory machine readable storage medium of claim 1, wherein the authentication uses cryptography and is authenticated at the service provider environment using the cryptography.

3. The non-transitory machine readable storage medium of claim 1, wherein the hardware capability is network bandwidth for streaming electronic data and the second limit is to increase the network bandwidth compared to the first limit for electronic content received from a particular service provider.

4. The non-transitory machine readable storage medium of claim 1, wherein the first limit and the second limit operate to limit a speed and/or width of data communicated over a peripheral component interface (PCI) of the internet capable device.

5. The non-transitory machine readable storage medium of claim 1, wherein the second configuration definition is encrypted by the service provider environment and is decrypted by the internet capable device.

6. A method for changing a hardware capability of an internet capable device, comprising:

restraining a hardware capability of an internet capable device to a first limit based at least in part on a first configuration definition;

receiving a request for a second configuration definition from a client device to change the first limit set by the first configuration definition, wherein the request includes an authentication identifying the internet capable device and indicating that the client device is authorized for a second limit based at least in part on a second configuration definition;

sending the request to a manager service of a service provider environment;

receiving the second configuration definition from the manager service of the service provider environment at the internet capable device after the authentication is validated at the service provider environment; and changing the hardware capability of the internet capable device to the second limit based at least in part on the second configuration definition, wherein the second configuration definition is loaded by a boot loader of the internet capable device, wherein the second limit is set for an amount of time after which the internet capable device reverts to the first limit.

7. The method of claim 6, wherein the second configuration definition is encrypted by the service provider environment and is decrypted by the internet capable device.

8. The method of claim 6, wherein the authentication is created using cryptography and is authenticated at the service provider environment using the cryptography.

9. The method of claim 6, wherein the hardware capability is a network bandwidth for streaming data and the second limit is to increase the network bandwidth compared to the first limit for content from a particular service provider.

10. The method of claim 6, wherein the first limit and the second limit operate to limit a speed and/or width of data communicated over a peripheral component interface (PCI) of the internet capable device.

11. The method of claim 6, wherein the second limit changes a frequency of at least one core of a processor associated with the internet capable device.

12. The method of claim 6, wherein the first limit and the second limit are set by turning on or off cores of a processor associated with the internet capable device.

13. The method of claim 6, wherein the internet capable device is a router and the hardware capability is network bandwidth.

14. The method of claim 6, wherein the internet capable device is a dual band router and the first limit and/or the second limit are set by turning on or off a band of the dual band router.

15. An internet capable device for multiple hardware capability configuration definitions, comprising:

a plurality of hardware capabilities for processing and exchanging data, the internet capable device further comprising:

a first configuration definition to set a first limit for the hardware capabilities;

a second configuration definition to set a second limit for the hardware capabilities, wherein the second limit allows for improved hardware capabilities as compared to the first configuration definition; and a configuration manager service to detect a command at the internet capable device to provide electronic content from a defined service provider to a client device and to set the internet capable device to use the second configuration definition for the electronic content while providing the electronic content from the defined service provider after an authentication is validated, wherein the second configuration definition is loaded by a boot loader of the internet capable device, and to revert the internet capable device to the first configuration definition upon providing the electronic content from the defined service provider, wherein the authentication identifies the internet capable device and indicates that the client device is authorized for the second limit based at least in part on the second configuration definition, and the second limit is set for an amount of time after which the internet capable device reverts to the first limit.

16. The internet capable device of claim 15, wherein the hardware capabilities include network bandwidth for streaming electronic data and the second limit is to increase the network bandwidth compared to the first limit for electronic content received from a defined service provider.

17. The internet capable device of claim 15, wherein the first limit and the second limit operate to limit a speed and/or bandwidth of data communicated over a peripheral component interface (PCI) of the internet capable device.

18. The internet capable device of claim 15, wherein the second limit changes a frequency of at least one core of a processor associated with the internet capable device.

19. The internet capable device of claim 15, wherein the first limit and the second limit are set by turning on or off cores of a processor associated with the internet capable device.

20. The internet capable device of claim 15, wherein the internet capable device is a dual band router and the first limit and/or the second limit are set by turning on or off a band of the dual band router.

* * * * *